(12) United States Patent
Pezeshki et al.

(10) Patent No.: US 11,792,877 B2
(45) Date of Patent: Oct. 17, 2023

(54) INDICATION TRIGGERING TRANSMISSION OF KNOWN DATA FOR TRAINING ARTIFICIAL NEURAL NETWORKS

(71) Applicant: QUALCOMM Incorporated, San Diego, CA (US)

(72) Inventors: Hamed Pezeshki, San Diego, CA (US); Sony Akkarakaran, Poway, CA (US); Tao Luo, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/176,738

(22) Filed: Feb. 16, 2021

(65) Prior Publication Data

US 2021/0267006 A1    Aug. 26, 2021

Related U.S. Application Data

(60) Provisional application No. 62/980,066, filed on Feb. 21, 2020.

(51) Int. Cl.
*H04W 76/27* (2018.01)
*G06N 3/08* (2023.01)
(Continued)

(52) U.S. Cl.
CPC .............. *H04W 76/27* (2018.02); *G06N 3/08* (2013.01); *H04L 1/0003* (2013.01); *H04W 72/21* (2023.01); *H04W 72/23* (2023.01)

(58) Field of Classification Search
CPC ............. H04W 76/27; H04W 72/0413; H04W 72/042; G06N 3/08; G06N 3/0445;
(Continued)

(56) References Cited

U.S. PATENT DOCUMENTS 11,132,602 B1 *   9/2021   Xie ..................... H04L 63/1433
2007/0043565 A1   2/2007   Aggarwal et al.
(Continued)

FOREIGN PATENT DOCUMENTS

WO         2020032678 A1     2/2020
WO    WO-2021001041 A1 *    1/2021    ........... H04L 1/1854
(Continued)

OTHER PUBLICATIONS

International Search Report and Written Opinion—PCT/US2021/018421—ISA/EPO—dated Apr. 26, 2021.

*Primary Examiner* — Ayaz R Sheikh
*Assistant Examiner* — Tarell A Hampton
(74) *Attorney, Agent, or Firm* — Seyfarth Shaw LLP

(57) ABSTRACT

A method of wireless communications by a receiving device includes communicating about content of a known payload with a transmitting device. The method also includes requesting, from the transmitting device, the known payload for training an artificial neural network. The method also receives the known payload in response to the request. The method further performs online training of the artificial neural network with the known payload. A method of wireless communications by a transmitting device includes communicating about content of a known payload with a receiving device and then transmitting an indication informing the receiving device that the known payload will be transmitted. The transmitting device unicasts the known payload to the receiving device for online training of a neural network.

30 Claims, 10 Drawing Sheets

(51) Int. Cl.
*H04L 1/00* (2006.01)
*H04W 72/21* (2023.01)
*H04W 72/23* (2023.01)

(58) Field of Classification Search
CPC .. G06N 3/0472; G06N 3/0481; G06N 3/0454; G06N 3/084; H04L 1/0003; H04L 5/0044
See application file for complete search history.

(56) References Cited

U.S. PATENT DOCUMENTS

| | | | | |
|---|---|---|---|---|
| 2007/0171857 A1* | 7/2007 | Wang | ............... | H04W 12/037 370/328 |
| 2007/0237081 A1* | 10/2007 | Kodialam | ............ | H04W 40/12 370/235 |
| 2011/0007643 A1 | 1/2011 | Liang et al. | | |
| 2011/0143796 A1 | 6/2011 | Lee et al. | | |
| 2011/0273996 A1* | 11/2011 | Kim | ............... | H04J 11/0069 370/242 |
| 2013/0121269 A1* | 5/2013 | Nammi | ............ | H04L 25/03343 370/329 |
| 2013/0279344 A1* | 10/2013 | Wang | ............... | H04W 72/0406 370/329 |
| 2013/0315188 A1* | 11/2013 | Pajukoski | ............ | H04B 17/24 370/329 |
| 2014/0037014 A1* | 2/2014 | Murata | ............... | H04N 19/93 375/240.23 |
| 2014/0226552 A1* | 8/2014 | Niu | ............... | H04W 4/06 370/312 |
| 2014/0355493 A1* | 12/2014 | Niu | ............... | H04W 72/042 370/312 |
| 2015/0003338 A1* | 1/2015 | Xue | ............... | H04L 25/03891 370/329 |
| 2015/0009939 A1* | 1/2015 | Zhang | ............... | H04L 5/0037 370/329 |
| 2015/0016553 A1* | 1/2015 | Yang | ............... | H04L 1/1812 375/261 |
| 2015/0223075 A1* | 8/2015 | Bashar | ............... | H04W 74/08 370/329 |
| 2015/0230092 A1* | 8/2015 | Ueki | ............... | H04W 48/02 455/411 |
| 2015/0295976 A1* | 10/2015 | Lee | ............... | H04L 65/762 709/219 |
| 2016/0157258 A1* | 6/2016 | Saiwai | ............... | H04W 16/28 370/329 |
| 2016/0295298 A1* | 10/2016 | Lee | ............... | H04N 21/2381 |
| 2016/0353424 A1* | 12/2016 | Stirling-Gallacher | ............... | H04B 7/0626 |
| 2018/0206223 A1 | 7/2018 | Kim et al. | | |
| 2019/0029071 A1* | 1/2019 | Moon | ............... | H04B 7/0617 |
| 2019/0149298 A1* | 5/2019 | Yang | ............... | H04W 72/0446 370/336 |
| 2019/0261193 A1* | 8/2019 | Torsner | ............... | G06T 7/20 |
| 2019/0356516 A1 | 11/2019 | Cao et al. | | |
| 2019/0370681 A1* | 12/2019 | Oba | ............... | G06N 20/10 |
| 2020/0120131 A1* | 4/2020 | Soni | ............... | H04L 47/12 |
| 2020/0136957 A1* | 4/2020 | Sanchez Charles | .... | H04L 45/14 |
| 2020/0313977 A1* | 10/2020 | Kapinos | ............... | G06N 20/00 |
| 2020/0403898 A1* | 12/2020 | Lee | ............... | G06K 9/6256 |
| 2020/0404648 A1* | 12/2020 | Kim | ............... | H04W 72/0446 |
| 2021/0049451 A1* | 2/2021 | Wang | ............... | G06N 3/0454 |
| 2021/0064996 A1* | 3/2021 | Wang | ............... | H04W 24/08 |

FOREIGN PATENT DOCUMENTS

| | | | | |
|---|---|---|---|---|
| WO | WO-2021026728 A1 * | 2/2021 | ............... | H04L 1/08 |
| WO | WO-2021029889 A1 * | 2/2021 | ............ | G06N 3/0445 |

* cited by examiner

INDICATION TRIGGERING TRANSMISSION OF KNOWN DATA FOR TRAINING ARTIFICIAL NEURAL NETWORKS

CROSS-REFERENCE TO RELATED APPLICATION

The present application claims the benefit of U.S. Provisional Patent Application No. 62/980,066 filed on Feb. 21, 2020, and titled "INDICATION TRIGGERING TRANSMISSION OF KNOWN DATA FOR TRAINING ARTIFICIAL NEURAL NETWORKS," the disclosure of which is expressly incorporated by reference it its entirety.

FIELD OF THE DISCLOSURE

Aspects of the present disclosure generally relate to wireless communications, and more particularly to techniques and apparatuses for triggering a future known payload to be used for training artificial neural networks.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a New Radio (NR) BS, a fifth generation (5G) Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in NR and LTE technologies. Preferably, these improvements should be applicable to other multiple access technologies and the telecommunications standards that employ these technologies.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to an aspect of the present disclosure, a method of wireless communications by a receiving device includes communicating about content of a known payload with a transmitting device. The method also includes requesting from the transmitting device, the known payload for training an artificial neural network. The method also includes receiving the known payload in response to the request. The method further includes performing online training of the artificial neural network with the known payload.

In another aspect, a method of wireless communications by a transmitting device includes communicating about content of a known payload with a receiving device. The method further includes transmitting an indication that informs the receiving device that the known payload will be transmitted. The method also includes unicasting the known payload to the receiving device for online training of a neural network.

According to a further aspect of the present disclosure, a receiving device has a memory and at least one processor coupled to the memory and configured to communicate about content of a known payload with a transmitting device. The receiving device is also configured to request, from the transmitting device, the known payload for training an artificial neural network. The receiving device is configured to receive the known payload in response to the request. The receiving device is further configured to perform online training of the artificial neural network with the known payload.

According to an aspect of the present disclosure, a transmitting device has a memory and at least one processor coupled to the memory and configured to communicate about content of a known payload with a receiving device. The transmitting device is further configured to transmit an indication informing a receiving device that a known payload will be transmitted. The transmitting device is also configured to unicast the known payload to the receiving device for online training of a neural network.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
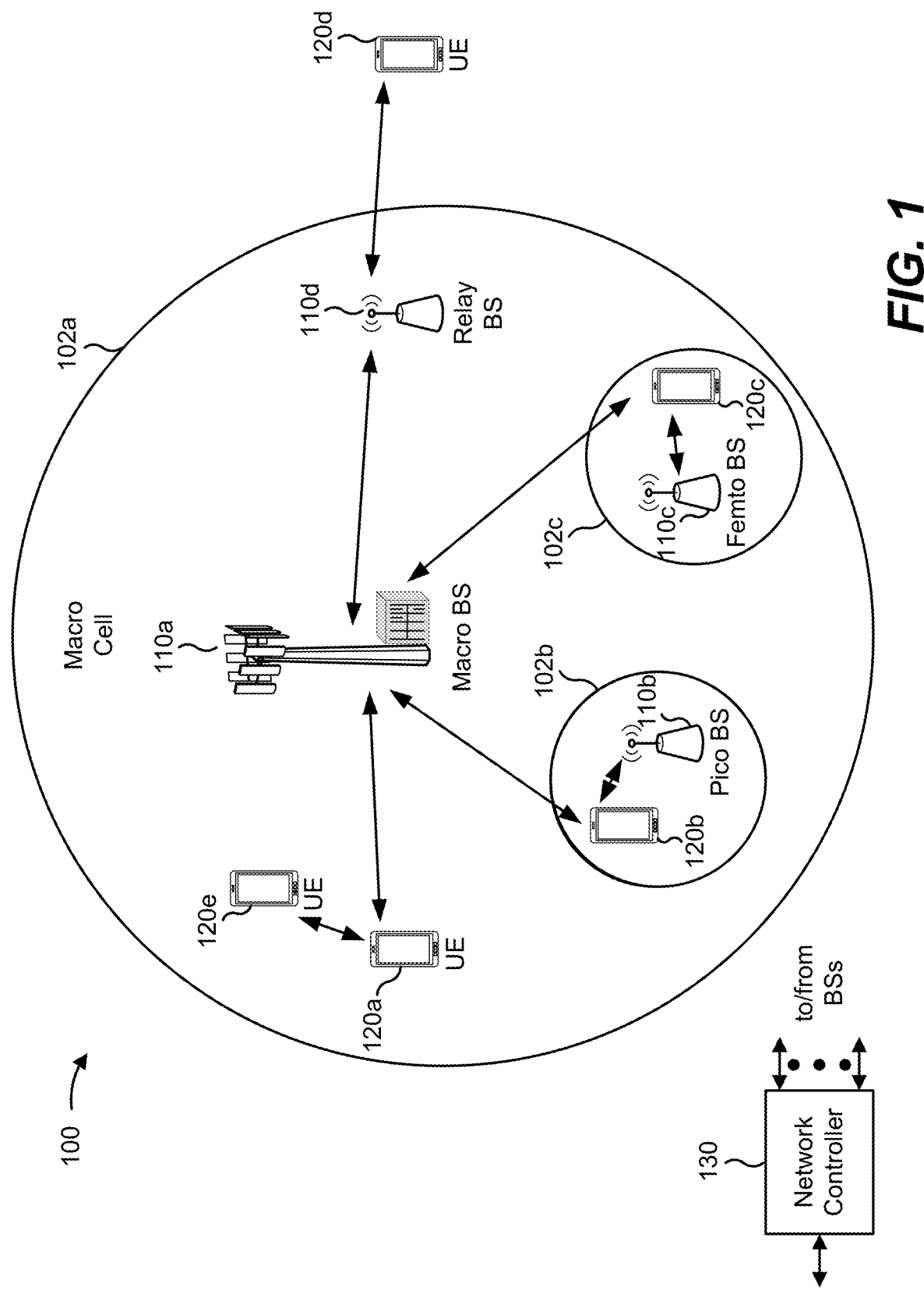
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Artificial intelligence (AI)/machine learning (ML) algorithms can improve wireless communications. An AI/ML module can run at the UE, the base station or in the case of distributed algorithms, jointly across the UE and base station. Although the present disclosure can refer to the AI/ML module on the UE side, the present disclosure expressly contemplates an auto-encoder scenario. In the auto-encoder scenario, joint training occurs.

In order to achieve useful results, the neural networks executing the AI/ML algorithms needs to be trained. Offline training of the neural networks can derive weights and biases of the neural network from training data. Offline training, however, does not account for the dynamic real world environment of the wireless communications. Online training accounts for the dynamic environment. Online training can be accomplished with known over-the-air transmissions (or signaling) reflective of the wireless environment. For the online training procedure, instead of initiating the training from scratch, training can start from the values for weights and biases derived from the offline training phase, and further fine-tune the neural network with regard to wireless channels, noise, and/or other environmental characteristics.

Reference signals, such as demodulation reference signals (DMRS), channel state information reference signals (CSI-RS), etc., are known transmissions. Reference signals, however, may not provide the appropriate type of information for some types of machine learning models. Data transmissions may be desirable for certain machine learning models, such as for log-likelihood ratio (LLR) computation, MIMO demapping, etc. Known data transmissions can include, for example, known payloads of a physical downlink control channel (PDCCH), physical uplink control channel (PUCCH), physical downlink shared channel (PDSCH), and/or physical uplink shared channel (PUSCH).

According to aspects of the present disclosure, both the base station and UE communicate about (know/agree) in advance on the payload/content of certain physical channel transmissions. These known transmissions can be immediately used for ground truth labels in online training of a neural network. For online training purposes, a signaling framework can enable the UEs to train their respective neural networks. Sending a 'known payload' that is known to both sides could be beneficial in a number of contexts, as the receiver does not need to fully decode the payload to find the labels for training. Based on which type of neural network the UE or base station will train, the receiving device may need different types of data. Thus, a receiver-specific known payload may be generated. The known payload may include data targeted for a specific receiver (e.g., modulation and coding scheme (MCS), rank, beam pair, etc.).

FIG. 1 is a diagram illustrating a network 100 in which aspects of the present disclosure may be practiced. The network 100 may be a 5G or NR network or some other wireless network, such as an LTE network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110.

As indicated above, FIG. 1 is provided merely as an example. Other examples may differ from what is described with regard to FIG. 1.

Figure 2:
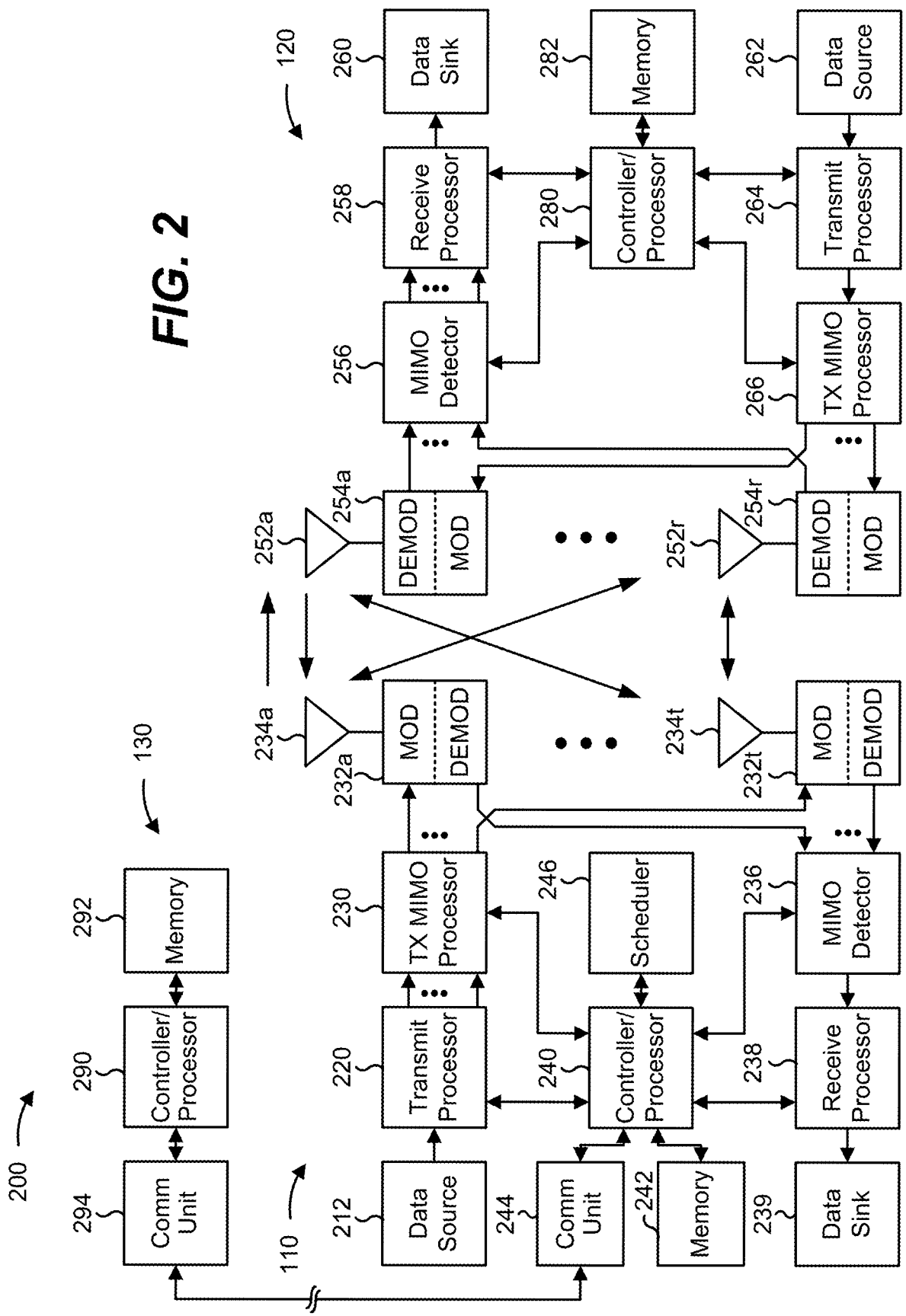
FIG. 2 is a block diagram conceptually illustrating an example of a base station in communication with a user equipment (UE) in a wireless communications network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 254, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communications unit 244 and communicate to network controller 130 via communications unit 244. Network controller 130 may include communications unit 294, controller/processor 290, and memory 292.

Controller/processor 240 of base station 110, controller/processor 280 of UE 120, and/or any other component(s) of FIG. 2 may perform one or more techniques associated with triggering known payloads for neural network training, as described in more detail elsewhere. For example, controller/processor 240 of base station 110, controller/processor 280 of UE 120, and/or any other component(s) of FIG. 2 may perform or direct operations of, for example, the processes 700, 800 of FIGS. 7-8 and/or other processes as described. Memories 242 and 282 may store data and program codes for base station 110 and UE 120, respectively. A scheduler 246 may schedule UEs for data transmission on the downlink and/or uplink.

In some aspects, UE 120 may include means for communicating, means for receiving, means for unicasting, means for transmitting, means for requesting, and means for training. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
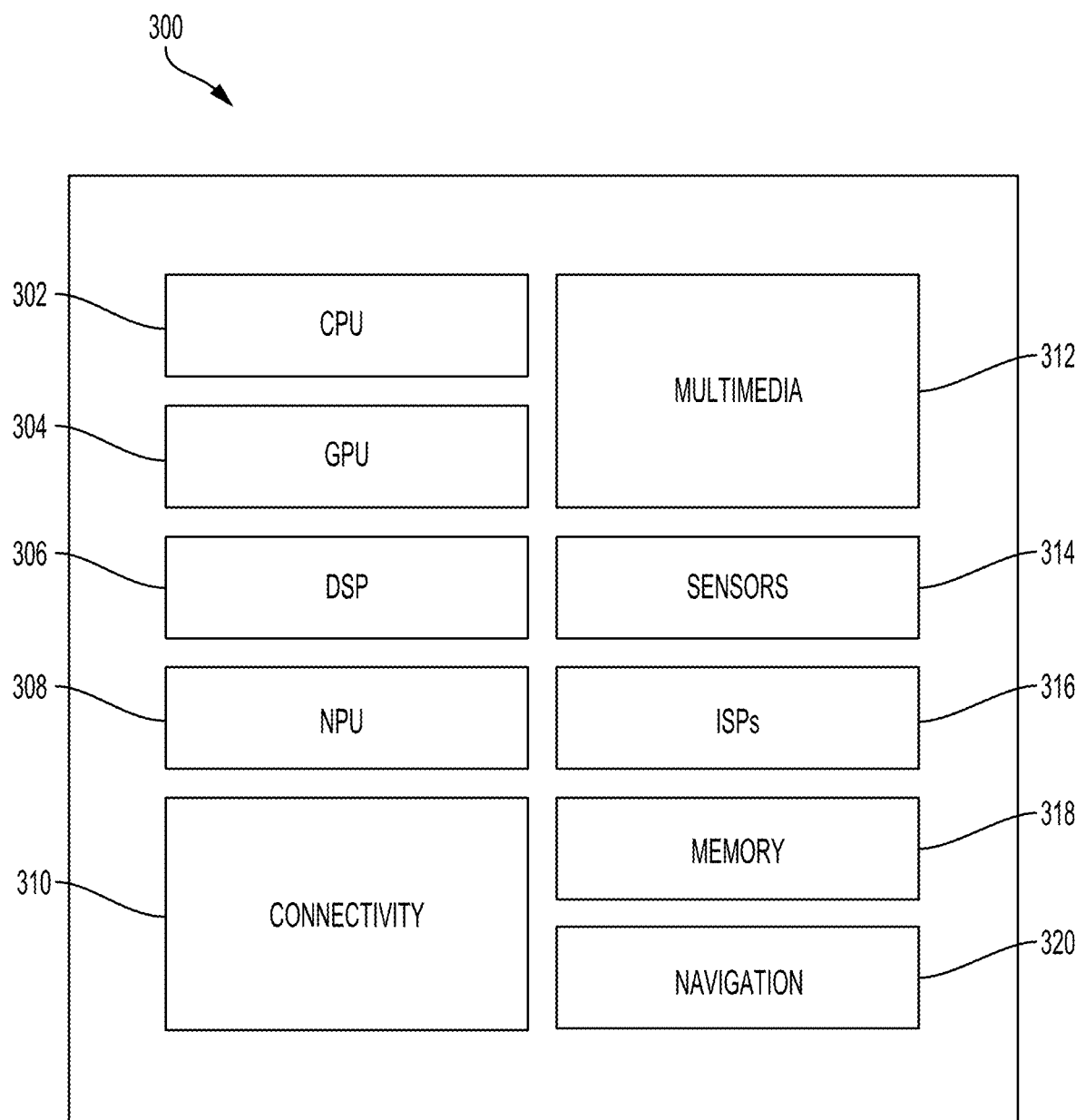
FIG. 3 illustrates an example implementation of designing a neural network using a system-on-a-chip (SOC), including a general-purpose processor in accordance with certain aspects of the present disclosure.

FIG. 3 illustrates an example implementation of a system-on-a-chip (SOC) 300, which may include a central processing unit (CPU) 302 or a multi-core CPU configured for triggering known payloads for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to communicate about content of a known payload with a transmitting device. The instructions may also include code to request, from the transmitting device, the known payload for training an artificial neural network. The instructions may also include code to receive the known payload in response to the request, and code to perform online training of the artificial neural network with the known payload. The instructions loaded into the general-purpose processor 302 may comprise code to communicate about content of a known payload with a transmitting device and code to transmit an indication informing the receiving device that the known payload will be transmitted. The instructions may also include code to unicast the known payload to the receiving device for training a neural network.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
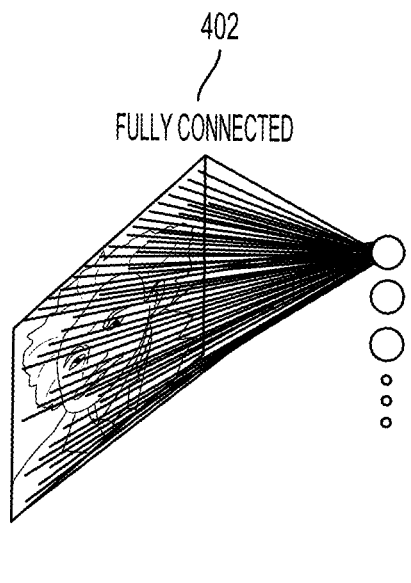
FIGS. 4A, 4B, and 4C are diagrams illustrating a neural network in accordance with aspects of the present disclosure.
Figure 4B:
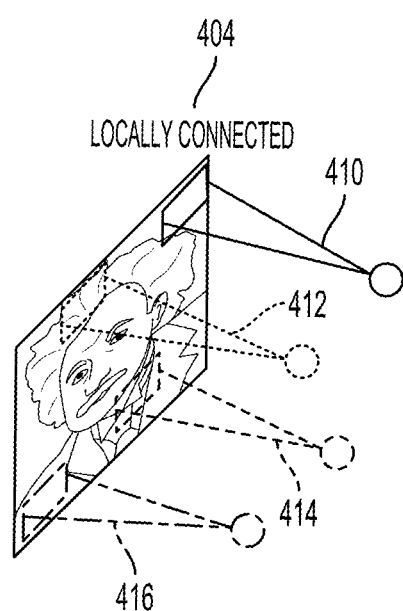

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
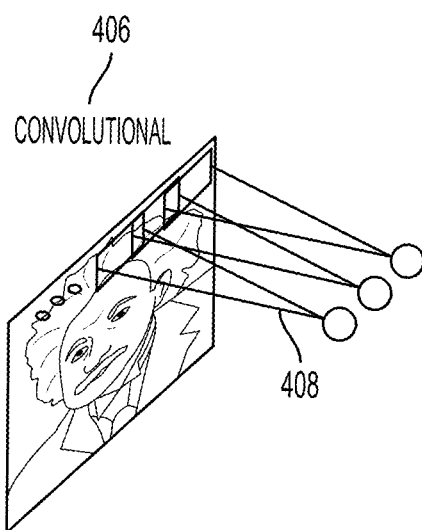

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
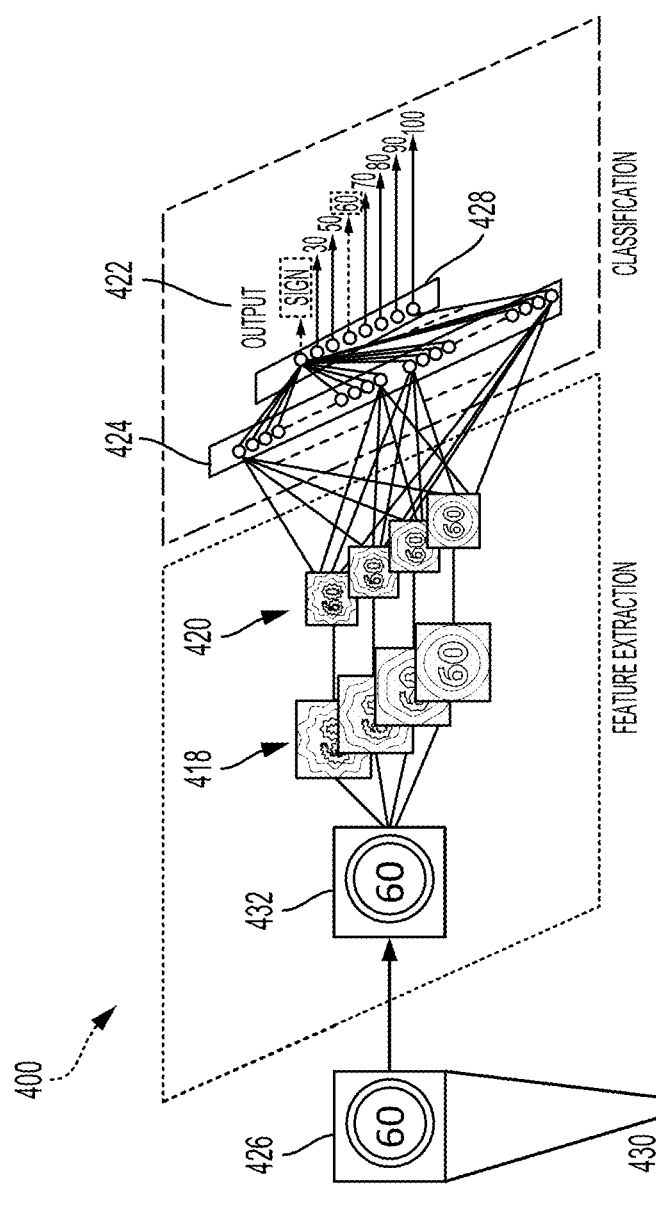
FIG. 4D is a diagram illustrating an exemplary deep convolutional network (DCN) in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
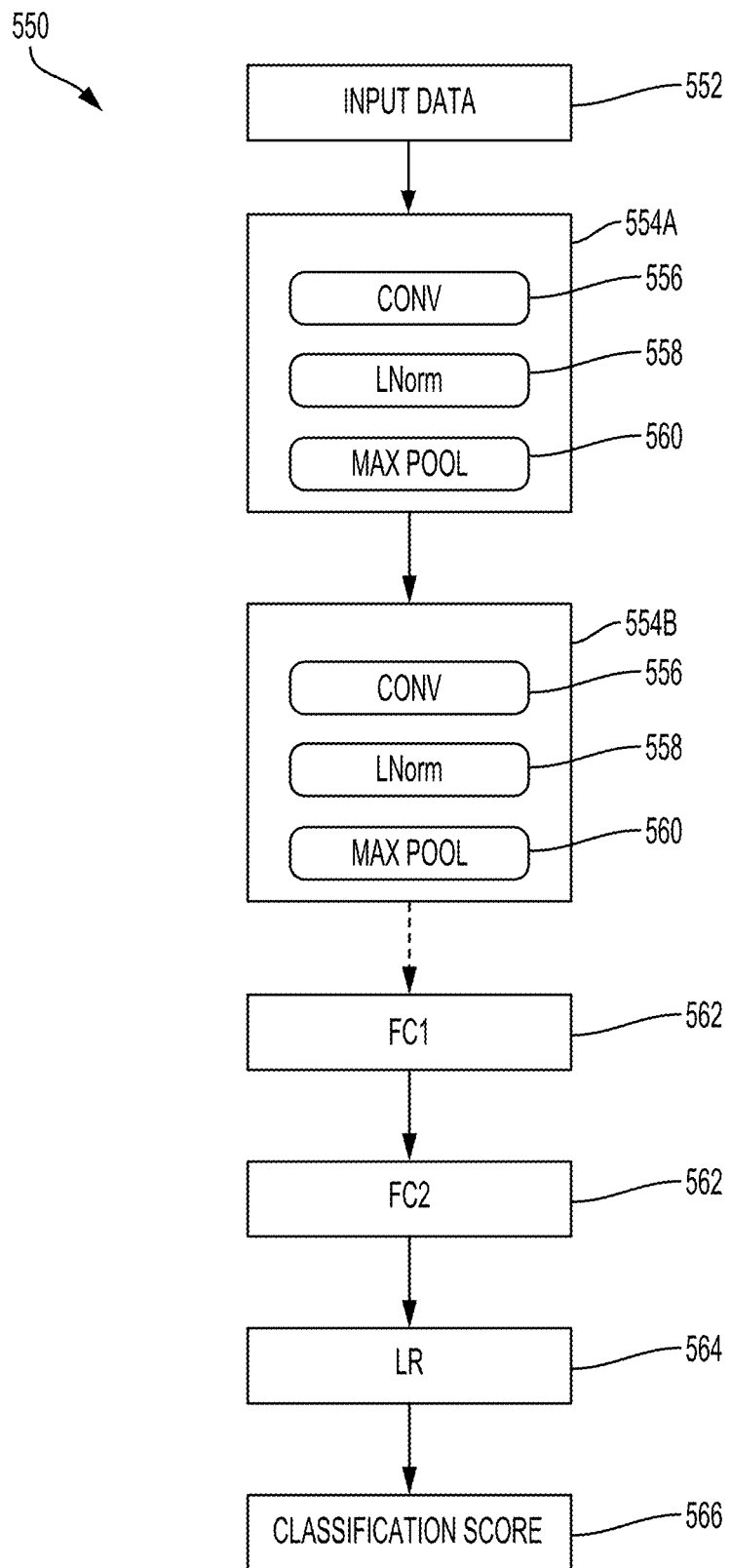
FIG. 5 is a block diagram illustrating an exemplary deep convolutional network (DCN) in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As described above, artificial intelligence (AI)/machine learning (ML) algorithms can improve wireless communications. An AI/ML module can run at the UE, the base station or in the case of distributed algorithms, jointly across the UE and base station. Although the present disclosure refers to the AI/ML module on the UE side, the present disclosure expressly contemplates an auto-encoder scenario and scenarios where an AI module runs on the network side. In the auto-encoder scenario, joint training occurs.

In order to achieve useful results, the neural networks executing the AI/ML algorithms needs to be trained. Offline training of the neural networks can derive weights and biases of the neural network from training data. Offline training, however, does not account for the dynamic real world environment of the wireless communications. Online training accounts for the dynamic environment. Online training can be accomplished with known over-the-air transmissions (or signaling) reflective of the wireless environment. For the online training procedure, instead of initiating the training from scratch, training can start from the values for weights and biases derived from the offline training phase, and further fine-tune the neural network with regard to wireless channels, noise, and/or other environmental characteristics.

Reference signals, such as demodulation reference signals (DMRS), channel state information reference signals (CSI-RS), etc., are known transmissions. Reference signals, however, may not provide the appropriate type of information for some types of machine learning models. Data transmissions may be desirable for certain machine learning models, such as for log-likelihood ratio (LLR) computation, MIMO demapping, etc. Known data transmissions can include, for example, known payloads of a physical downlink control channel (PDCCH), physical uplink control channel (PUCCH), physical downlink shared channel (PDSCH), and/or physical uplink shared channel (PUSCH).

A generalized machine learning model for a MIMO demapper may be represented, for example, as $y=Hx+n$, where y is the received vector, x is the transmitted symbol vector, n is the noise vector, and H is the channel matrix. The neural network (NN) may be trained offline to determine $\hat{x}$ (estimated symbols) and may benefit from fine-tuning using online training. The inputs to the neural network are received observations (y), and the estimated channel matrix (11), and the outputs are detected transmitted symbols, e.g., $\hat{x}$. In this case, the ground truth labels are indeed the known payload used for training the neural network. This way the device (UE or gNB) can perform further online training without having to decode y to use the decoded $\hat{x}$ as the ground truth labels for the neural network. Because the payloads are known, the machine learning model can use the training data to learn how to interpret the symbols in the presence of channel characteristics, noise characteristics, and/or the like.

This is just an illustrative example of how this known data transmission for the purpose of online training may be useful. The above example has applications in the context of unicast transmissions where the base station specifically sends training data to a given UE (given multiple input multiple output (MIMO) rank, modulation and coding scheme (MCS), etc.) and that UE uses the training data to train its neural network. Additionally, the use case is not limited to a MIMO demapper, the neural network may be any type of neural network.

Regular data transmissions on these channels may be treated as known once they have been decoded. Regular transmissions include system information blocks (SIBs) that are known to repeat periodically in between the boundaries when system information (SI) changes. Regular transmissions also include usual unicast transmissions, once the cyclic redundancy check (CRC) passes. Decoding regular transmissions for training of the artificial neural networks, however, may use excessive memory and computation overhead, resulting in high latency. For example, received modulation symbols are stored until decoding completes, only after which the decoded symbols can be used for training purposes.

Thus, a mode may be desirable in which both the base station and UE know and/or agree in advance on the payload content of certain physical channel transmissions. These known transmissions can be immediately used for ground truth labels in online training of a neural network.

For online training purposes, a signaling framework can enable the UEs to train their respective neural networks. Sending a 'known payload' that is known to both sides could be beneficial in a number of contexts, as the receiver does not need to fully decode the payload to find the labels for training.

A base station may unicast the aforementioned "known data," so that a UE can use the data to train its neural networks. The transmissions are UE-specific and may be tailored for a specific theme, e.g., for a specific neural network. Similarly, a UE may unicast known data to the base station so the base station can train its neural networks. In some configurations, the known data is transmitted point-to-point because it is unlikely that other receiving devices will find the training data to be useful. The training data may be specifically tailored to a particular receiving device.

Based on which type of neural network the UE or base station will train, the receiving device may need different types of data. Thus, a receiver-specific known payload may be generated. The known payload may include data targeted for a specific receiver (e.g., MCS, rank, beam pair, etc.).

In some aspects of the present disclosure, the known payload may be generated in a way so that the UE and base station can independently generate the known payload. For example, the known payload may be based on a radio resource control (RRC) configured scrambling seed or may be any sequence known to both the UE and the base station.

Transmission of known data in the PDSCH for downlink training may be triggered by a UE request. Transmission of known data in the PUSCH for uplink training may be triggered by a base station request. The UE and base station requests may include specific characteristics, for example, MCS, beam pair, rank, etc. The training for a specific neural network will be based on these requested characteristics.

Transmission of known data in the PDSCH for downlink training may also be initiated by a base station indication. The indication can be in the PDCCH or a media access control (MAC) layer control element (MAC-CE). Transmission of known data in the PUSCH for uplink training may be initiated by a UE indication. The indication can be through the PUCCH or a MAC-CE.

According to aspects of the present disclosure, a location of the known payload (e.g., on which physical channel) and the exact time-frequency resources, periodicity (aperiodic, semi-persistent, periodic, etc.), duration, and/or aggregation level (for PDCCH), payload size, etc.) of the known payload may be explicitly signaled separately from the payload. For example, the base station may send information about the known payload. The explicit signaling may be via RRC messages, a MAC-control element (CE), or via PDCCH downlink control information (DCI).

Some non-limiting examples for known data locations include a PDSCH, a PUSCH, a PUCCH, and a PDCCH. For the PDCCH, the known payload may be paired with a known payload in the PDSCH or PUSCH. For the PDCCH and PUCCH, the known payload may be periodic, aperiodic, or semi-persistent, with the parameters signaled separately, as previously discussed. The parameters may include where and for how long the known payload is sent. In the case of periodic transmissions, a semi-persistent schedule or configured grant (CG) may be defined, onto which the known payload is mapped.

When the known payload is sent on PUCCH, the parameters related to the known payload may be signaled separately. This signaling can be via RRC messages, a MAC-CE, or downlink control information (DCI). The separately signaled parameters may include the PUCCH format, uplink control information (UCI) multiplexing on PUSCH, their payload sizes, etc. For example, the UCI types multiplexed on PUSCH may be signaled to the UE, such as whether HARQ-ACK is multiplexed on the PUSCH, or whether HARQ-ACK and CSI part one are multiplexed on the PUSCH.

Figure 6A:
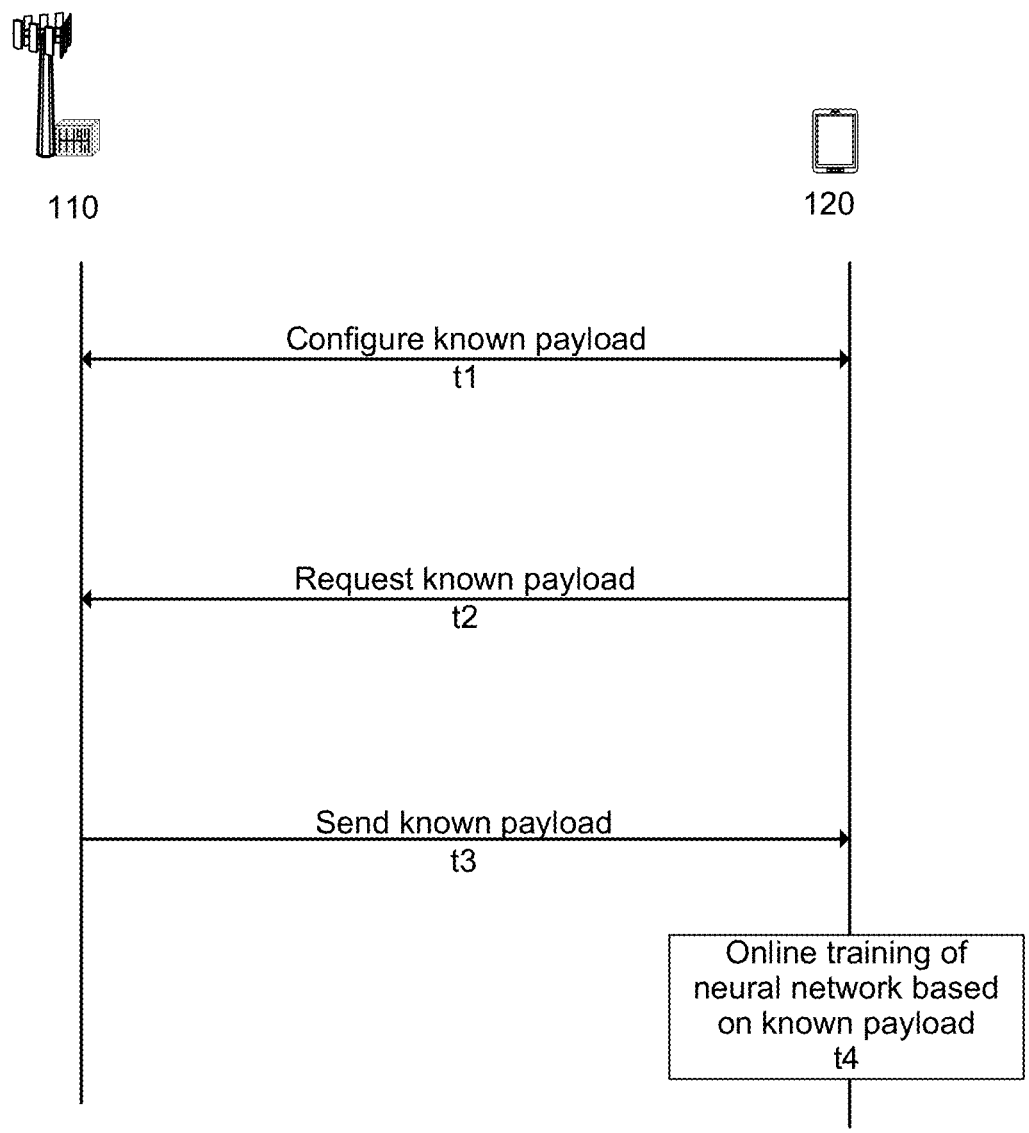
FIGS. 6A and 6B are timing diagrams illustrating triggering of a future known payload to be used for training artificial neural networks, in accordance with various aspects of the present disclosure.

FIG. 6A is a timing diagram illustrating triggering of a future known payload to be used for training artificial neural networks, in accordance with various aspects of the present disclosure. In the example shown in FIG. 6A, a base station 110 is shown as transmitting the known payload to a UE 120 for online training of the UE's neural network. This scenario is for illustration purposes only, as the UE 120 could also send the known payload to the base station 110, or a first UE 120 could send a known payload to another UE (not shown), for example via sidelink communications.

At time t1, the UE 120 and base station 110 agree on a known payload. In some aspects of the present disclosure, both the base station 110 and UE 120 know/agree in advance on the payload content of certain physical channel transmissions. For example, the UE 120 and base station 110 communicate about content of the known payload. These known transmissions can be immediately used for ground truth labels in online training of a neural network. Sending a 'known payload' that is known to both sides is beneficial in a number of contexts, as the receiver does not need to fully decode the payload to find the labels for training. In some aspects, the base station 110 configures the UE 120 with the known payload, for example via RRC signaling. For example, the known payload may be generated with a scrambling seed shared with the UE through RRC configuration.

At time t2, the UE 120 requests the known payload from the base station 110. The UE request may include specific characteristics, for example, MCS, beam pair, rank, etc. The training for a specific neural network will be based on these requested characteristics. The request from the UE 120 may be triggered by degradation of performance of the neural network at the UE side. For example, if performance of the neural network does not satisfy certain criteria, the neural network may have become outdated. Thus, fine tuning or updating of the network may occur with online training.

At time t3, the base station 110 transmits, for example via unicast, the aforementioned known data, so that the UE 120 can use the data to train its neural networks. The transmissions are UE-specific and can be tailored for a specific theme (e.g., for a specific neural network). The training data may be specifically tailored to a particular receiving device.

At time t4, the UE 120 performs online training of its neural network based on the received known payload. Because the payloads are known, the machine learning model can use the training data to learn how to interpret the symbols in the presence of channel characteristics, noise characteristics, and/or the like.

Figure 6B:
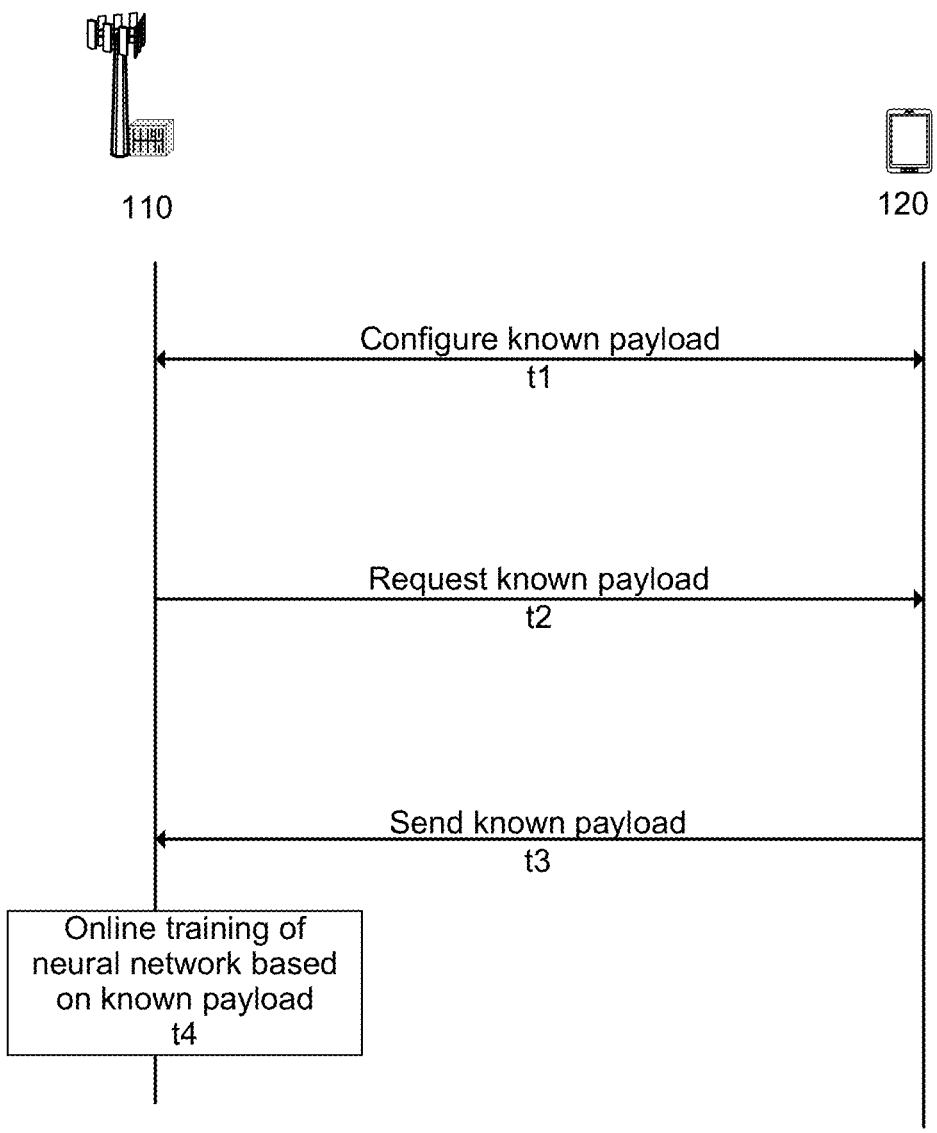

FIG. 6B is a timing diagram illustrating triggering of a future known payload to be used for training artificial neural networks, in accordance with various aspects of the present disclosure. In the example shown in FIG. 6B, a UE 120 is shown as transmitting the known payload to a base station 110 for online training of the base station's neural network.

At time t1, the UE 120 and base station 110 agree on a known payload. In some aspects of the present disclosure, both the base station 110 and UE 120 know/agree in advance on the payload content of certain physical channel transmissions. For example, the UE 120 and base station 110 communicate about content of the known payload. In some aspects, the base station 110 configures the UE 120 with the known payload, for example via RRC signaling. For example, the known payload may be generated with a scrambling seed shared with the UE through RRC configuration.

At time t2, the base station 110 requests the known payload from the UE 120. The request may include specific characteristics, for example, MCS, beam pair, rank, etc. The training for a specific neural network will be based on these requested characteristics. The request from the base station 110 may be triggered by degradation of performance of the neural network at the UE side. For example, if performance of the neural network does not satisfy certain criteria, the neural network may have become outdated. Thus, fine tuning or updating of the network may occur with online training.

At time t3, the UE 120 transmits the aforementioned known data, so that the base station 110 can use the data to train its neural networks. At time t4, the base station 110 performs online training of its neural networks based on the received known payload.

Figure 7:
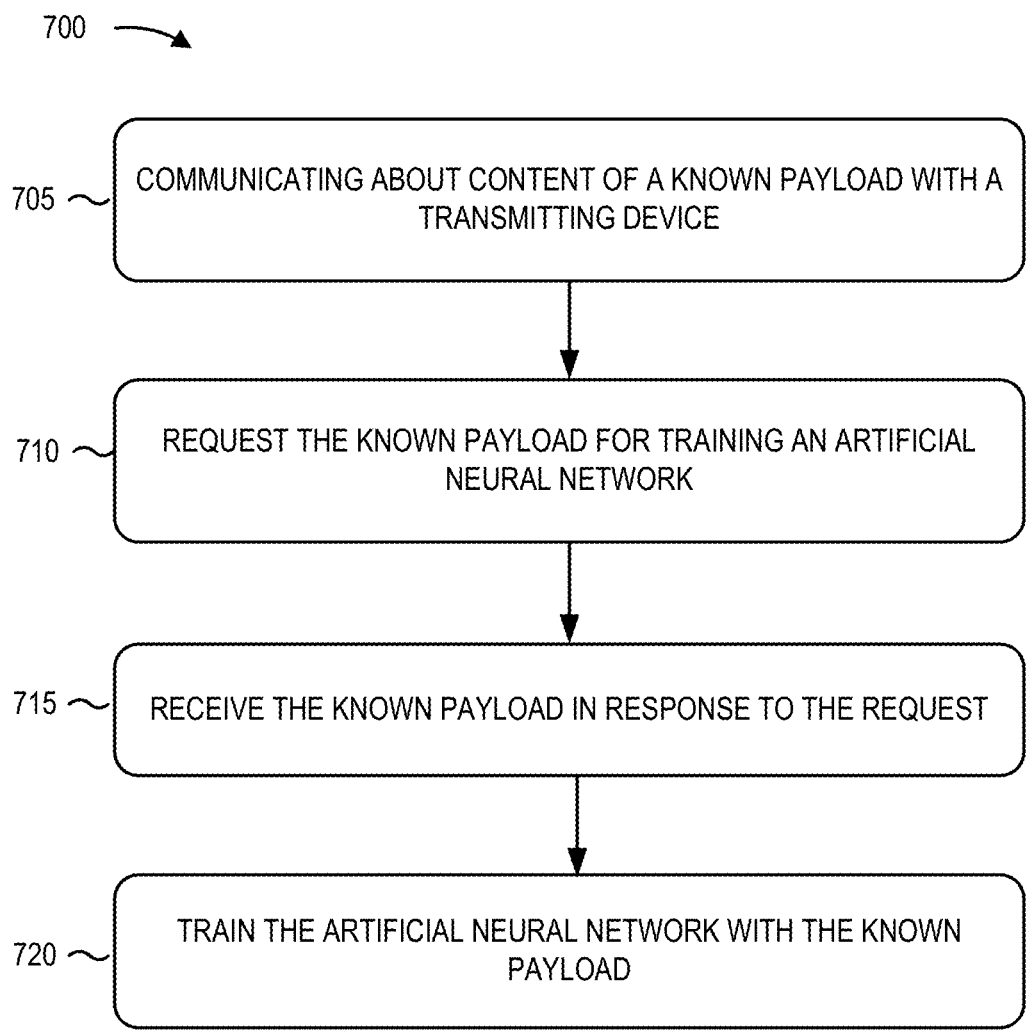
FIG. 7 is a diagram illustrating an example process performed, for example, by a receiving device, in accordance with various aspects of the present disclosure.

FIG. 7 is a diagram illustrating an example process 700 performed, for example, by a receiving device, in accordance with various aspects of the present disclosure. The example process 700 is an example of triggering a known payload, for example, for training artificial neural networks.

As shown in FIG. 7, in some aspects, the process 700 may include communicating about content of a known payload with a transmitting device (block 705). For example, the UE (e.g., using the antenna 252, DEMOD 254, TX MIMO processor 266, transmit processor 264, MIMO detector 256, receive processor 258, controller/processor 280, and or the like) or the base station (e.g., using the antenna 234, MOD 232, TX MIMO processor 230, transmit processor 220, MIMO detector 236, receive processor 238, controller/processor 240, and or the like) can communicate about the content.

The process 700 may include requesting a known payload for training an artificial neural network (block 710). For example, the UE (e.g., using the antenna 252, DEMOD 254, TX MIMO processor 266, transmit processor 264, controller/processor 280, and or the like) or the base station (e.g., using the antenna 234, MOD 232, TX MIMO processor 230, transmit processor 220, controller/processor 240, and or the like) can request a known payload for training an artificial neural network.

As shown in FIG. 7, in some aspects, the process 700 may include receiving the known payload in response to the request (block 715). For example, the UE (e.g., using the antenna 252, DEMOD 254, MIMO detector 256, receive processor 258, controller/processor 280, and or the like) or the base station (e.g., using the antenna 234, MOD 232, MIMO detector 236, receive processor 238, controller/processor 240, and or the like) can receive the known payload in response to the request.

As shown in FIG. 7, in some aspects, the process 700 may include online training of the artificial neural network with the known payload (block 720). For example, the UE (e.g., using the controller/processor 280, memory 282 and or the like) and the base station (e.g., using the controller/processor 240, memory 242 and or the like) can train the artificial neural network with the known payload. The known payload can be used to generate ground truth labels for training the neural network.

Figure 8:
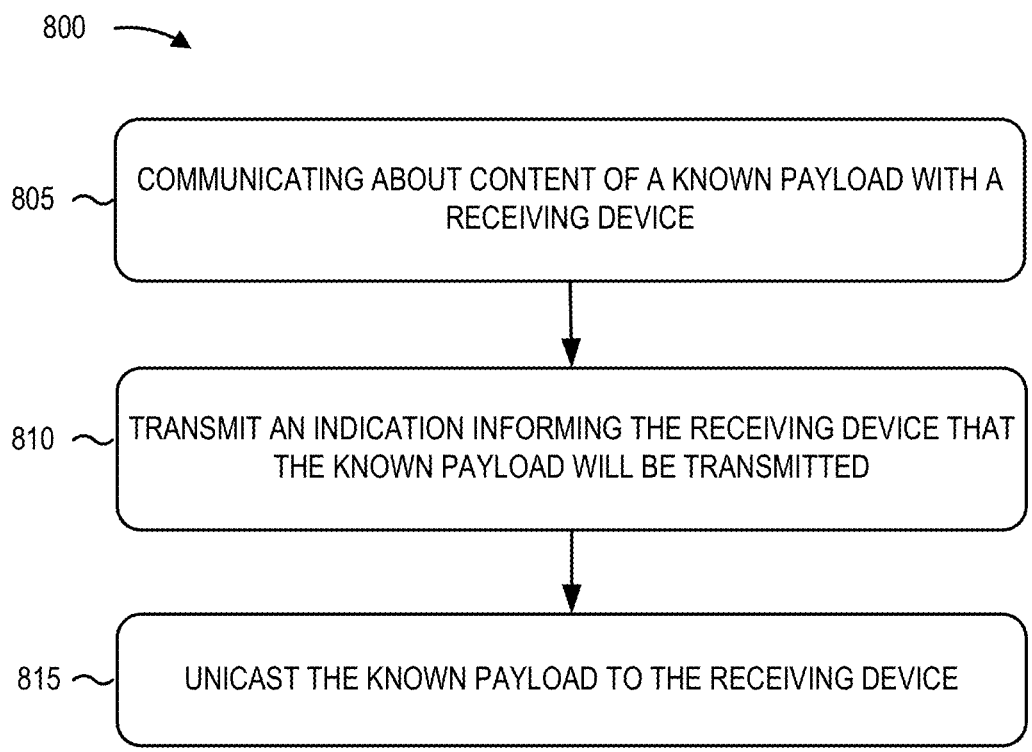
FIG. 8 is a diagram illustrating an example process performed, for example, by a transmitting device, in accordance with various aspects of the present disclosure.

FIG. 8 is a diagram illustrating an example process 800 performed, for example, by a transmitting device, in accordance with various aspects of the present disclosure. The example process 800 is an example of unicasting known data for training neural networks.

As shown in FIG. 8, in some aspects, the process 800 may include communicating about content of a known payload with a receiving device (block 805). For example, the UE (e.g., using the antenna 252, DEMOD 254, TX MIMO processor 266, transmit processor 264, MIMO detector 256, receive processor 258, controller/processor 280, and or the like) or the base station (e.g., using the antenna 234, MOD 232, TX MIMO processor 230, transmit processor 220, MIMO detector 236, receive processor 238, controller/processor 240, and or the like) can communicate about the content.

As shown in FIG. 8, in some aspects, the process 800 may include transmitting an indication informing the receiving device that the known payload will be transmitted (block 810). For example, the UE (e.g., using the antenna 252, DEMOD 254, TX MIMO processor 266, transmit processor 264, controller/processor 280, memory 282, and or the like) or the base station (e.g., using the antenna 234, MOD 232, TX MIMO processor 230, transmit processor 220, controller/processor 240, memory 242, and or the like) can transmit an indication informing the receiving device of the known payload.

As shown in FIG. 8, in some aspects, the process 800 may include unicasting the known payload to the receiving device for online training of a neural network (block 815). For example, the UE (e.g., using the antenna 252, DEMOD 254, TX MIMO processor 266, transmit processor 264, controller/processor 280, memory 282, and or the like) or the base station (e.g., using the antenna 234, MOD 232, TX MIMO processor 230, transmit processor 220, controller/processor 240, memory 242, and or the like) can unicast the known payload to the receiving device.

Implementation examples are described in the following numbered clauses:

1. A method of wireless communications by a receiving device, comprising:
communicating about content of a known payload with a transmitting device;
requesting, from the transmitting device, the known payload for training an artificial neural network;
receiving the known payload in response to the requesting; and
performing online training of the artificial neural network with the known payload.

2. The method of clause 1, in which the known payload is received in at least one of a physical downlink shared channel (PDSCH) or a physical uplink shared channel (PUSCH).

3. The method of any of the preceding clauses, in which the requesting for the known payload originates from either a user equipment (UE) for downlink training or a base station for uplink training.

4. The method of any of the preceding clauses, in which the requesting describes characteristics for the known payload, the characteristics comprising at least one of a modulation and coding scheme (MCS), a beam pair or a rank, the training based on the characteristics.

5. The method of any of the preceding clauses, further comprising receiving information comprising a periodicity, time and frequency resources, and payload size of the known payload, the information carried by at least one of radio resource control (RRC) signaling, a media access control layer (MAC) control element, or PDCCH downlink control information (DCI).

6. The method of clause 1, in which the known payload is received in at least one of a physical downlink control channel (PDCCH) or a physical uplink control channel (PUCCH).

7. The method of clause 6, in which the known payload is received in the PDCCH and paired with another known payload in one of a physical downlink shared channel (PDSCH) or a physical uplink shared channel (PUSCH).

8. The method of any of the preceding clauses, in which the known payload is based on a radio resource control (RRC) scrambling seed.

9. The method of any of the preceding clauses, in which the requesting occurs via a physical uplink control channel (PUCCH) or a media access control layer (MAC) control element (CE) for a UE, or via a physical downlink control channel (PDCCH) or a MAC-CE for a base station.

10. The method of any of the preceding clauses, in which the known payload is received in a physical uplink control channel (PUCCH) with related parameters signaled separately via radio resource control (RRC) signaling, downlink control information (DCI), or a media access control layer (MAC) control element (CE), the related parameters comprising at least one of a PUCCH format, uplink control information (UCI) types multiplexed, or payload size.

11. A method of wireless communications by a transmitting device, comprising:
communicating about content of a known payload with a receiving device;
transmitting an indication informing the receiving device that the known payload will be transmitted; and
unicasting the known payload to the receiving device for online training of a neural network.

12. The method of clause 11, in which the indication comprises a base station indication in either a physical downlink control channel (PDCCH) or a media access control (MAC) layer control element (MAC-CE) in response to the known payload being transmitted in a physical downlink shared channel (PDSCH) for downlink training.

13. The method of any of the preceding clauses, in which the indication comprises a user equipment (UE) indication in either a physical uplink control channel (PUCCH) or a media access control (MAC) layer control element (MAC-CE) in response to the known payload being transmitted in a physical uplink shared channel (PUSCH) for uplink training.

14. The method of any of the preceding clauses, further comprising transmitting information comprising a periodicity, time and frequency resources, and payload size of the known payload, the information carried by radio resource control (RRC) signaling, a media access control layer (MAC) control element, or PDCCH downlink control information (DCI).

15. The method of any of the preceding clauses, in which the known payload is based on a radio resource control (RRC) scrambling seed.

16. A receiving device for wireless communication, comprising:
a memory; and
at least one processor coupled to the memory and configured:
to communicate about content of a known payload with a transmitting device;
to request, from the transmitting device, the known payload for training an artificial neural network;
to receive the known payload in response to the requesting; and
to perform online training of the artificial neural network with the known payload.

17. The receiving device of clause 16, in which the known payload is received in at least one of a physical downlink shared channel (PDSCH) or a physical uplink shared channel (PUSCH).

18. The receiving device of any of the preceding clauses, in which the request for the known payload originates from either a user equipment (UE) for downlink training or a base station for uplink training.

19. The receiving device of any of the preceding clauses, in which the request describes characteristics for the known payload, the characteristics comprising at least one of a modulation and coding scheme (MCS), beam pair and/or rank, the training based on the characteristics.

20. The receiving device of clause 16, in which the known payload is received in a physical downlink control channel (PDCCH) and paired with another known payload in either a physical downlink shared channel (PDSCH) or a physical uplink shared channel (PUSCH).

21. The receiving device of any of the preceding clauses, in which the at least one processor is further configured to receive information comprising a periodicity, time/frequency, and payload size of the known payload, the information carried by at least one of radio resource control (RRC) signaling, a media access control layer (MAC) control element, or PDCCH downlink control information (DCI).

22. The receiving device of any of the preceding clauses, in which the known payload is based on a radio resource control (RRC) scrambling seed.

23. The receiving device of any of the preceding clauses, in which the at least one processor is further configured to request via a physical uplink control channel (PUCCH) or a media access control layer (MAC) control element (CE) for a UE, or via a physical downlink control channel (PDCCH) or a MAC-CE for a base station.

24. The receiving device of clause 16, in which the known payload is received in a physical uplink control channel (PUCCH) with related parameters signaled separately via radio resource control (RRC) signaling, downlink control information (DCI), or a media access control layer (MAC) control element (CE), the related parameters comprising at least one of a PUCCH format, uplink control information (UCI) types multiplexed, or payload size.

25. A transmitting device for wireless communication comprising:
a memory; and
at least one processor coupled to the memory and configured:
to communicate about content of a known payload with a receiving device;
to transmit an indication informing the receiving device that the known payload will be transmitted; and
to unicast the known payload to the receiving device for online training of a neural network.

26. The transmitting device of clause 25, in which the indication comprises a base station indication in either a physical downlink control channel (PDCCH) or a media access control (MAC) layer control element (MAC-CE) in response to the known payload being transmitted in a physical downlink shared channel (PDSCH) for downlink training.

27. The transmitting device of clause 25, in which the indication comprises a user equipment (UE) indication in either a physical uplink control channel (PUCCH) or a media access control (MAC) layer control element (MAC-CE) in response to the known payload being transmitted in a physical uplink shared channel (PUSCH) for uplink training.

28. The transmitting device of any of the preceding clauses, in which the at least one processor is further configured to transmit information comprising a periodicity, time and frequency resources, and payload size of the known payload, the information carried by radio resource control (RRC) signaling, a media access control layer (MAC) control element, or PDCCH downlink control information (DCI).

29. The transmitting device of any of the preceding clauses, in which the known payload is based on a radio resource control (RRC) scrambling seed.

30. The transmitting device of any of the preceding clauses, in which the at least one processor is further configured to request via a physical uplink control channel (PUCCH) or a media access control layer (MAC) control element (CE) for a UE, or via a physical downlink control channel (PDCCH) or a MAC-CE for a base station.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a receiving device, comprising:
   communicating about content of a known payload with a transmitting device;
   requesting, from the transmitting device, the known payload for training an artificial neural network;
   receiving the known payload in response to the requesting;
   finding labels for training based on the known payload, without fully decoding the known payload; and
   performing online training of the artificial neural network with the labels from the known payload.

2. The method of claim 1, in which the known payload is received in at least one of a physical downlink shared channel (PDSCH) or a physical uplink shared channel (PUSCH).

3. The method of claim 2, in which the requesting for the known payload originates from either a user equipment (UE) for downlink training or a base station for uplink training.

4. The method of claim 1, in which the requesting describes characteristics for the known payload, the characteristics comprising at least one of a modulation and coding scheme (MCS), a beam pair or a rank, the training based on the characteristics.

5. The method of claim 1, further comprising receiving information comprising a periodicity, time and frequency resources, and payload size of the known payload, the information carried by at least one of radio resource control (RRC) signaling, a media access control layer (MAC) control element, or PDCCH downlink control information (DCI).

6. The method of claim 1, in which the known payload is received in at least one of a physical downlink control channel (PDCCH) or a physical uplink control channel (PUCCH).

7. The method of claim 6, in which the known payload is received in the PDCCH and paired with another known payload in one of a physical downlink shared channel (PDSCH) or a physical uplink shared channel (PUSCH).

8. The method of claim 1, in which the known payload is based on a radio resource control (RRC) scrambling seed.

9. The method of claim 1, in which the requesting occurs via a physical uplink control channel (PUCCH) or a media access control layer (MAC) control element (CE) for a UE, or via a physical downlink control channel (PDCCH) or a MAC-CE for a base station.

10. The method of claim 1, in which the known payload is received in a physical uplink control channel (PUCCH) with related parameters signaled separately via radio resource control (RRC) signaling, downlink control information (DCI), or a media access control layer (MAC) control element (CE), the related parameters comprising at least one of a PUCCH format, uplink control information (UCI) types multiplexed, or payload size.

11. A method of wireless communications by a transmitting device, comprising:
communicating about content of a known payload with a receiving device;
transmitting an indication informing the receiving device that the known payload will be transmitted; and
unicasting the known payload to the receiving device for finding labels for training based on the known payload and for online training of a neural network with the labels from the known payload, without fully decoding the known payload.

12. The method of claim 11, in which the indication comprises a base station indication in either a physical downlink control channel (PDCCH) or a media access control (MAC) layer control element (MAC-CE) in response to the known payload being transmitted in a physical downlink shared channel (PDSCH) for downlink training.

13. The method of claim 11, in which the indication comprises a user equipment (UE) indication in either a physical uplink control channel (PUCCH) or a media access control (MAC) layer control element (MAC-CE) in response to the known payload being transmitted in a physical uplink shared channel (PUSCH) for uplink training.

14. The method of claim 11, further comprising transmitting information comprising a periodicity, time and frequency resources, and payload size of the known payload, the information carried by radio resource control (RRC) signaling, a media access control layer (MAC) control element, or PDCCH downlink control information (DCI).

15. The method of claim 11, in which the known payload is based on a radio resource control (RRC) scrambling seed.

16. A receiving device for wireless communication, comprising:
a memory; and
at least one processor coupled to the memory and configured:
to communicate about content of a known payload with a transmitting device;
to request, from the transmitting device, the known payload for training an artificial neural network;
to receive the known payload in response to the requesting;
to find labels for training based on the known payload, without fully decoding the known payload; and
to perform online training of the artificial neural network with the labels from the known payload.

17. The receiving device of claim 16, in which the known payload is received in at least one of a physical downlink shared channel (PDSCH) or a physical uplink shared channel (PUSCH).

18. The receiving device of claim 16, in which the request for the known payload originates from either a user equipment (UE) for downlink training or a base station for uplink training.

19. The receiving device of claim 16, in which the request describes characteristics for the known payload, the characteristics comprising at least one of a modulation and coding scheme (MCS), beam pair and/or rank, the training based on the characteristics.

20. The receiving device of claim 16, in which the known payload is received in a physical downlink control channel (PDCCH) and paired with another known payload in either a physical downlink shared channel (PDSCH) or a physical uplink shared channel (PUSCH).

21. The receiving device of claim 16, in which the at least one processor is further configured to receive information comprising a periodicity, time/frequency, and payload size of the known payload, the information carried by at least one of radio resource control (RRC) signaling, a media access control layer (MAC) control element, or PDCCH downlink control information (DCI).

22. The receiving device of claim 16, in which the known payload is based on a radio resource control (RRC) scrambling seed.

23. The receiving device of claim 16, in which the at least one processor is further configured to request via a physical uplink control channel (PUCCH) or a media access control layer (MAC) control element (CE) for a UE, or via a physical downlink control channel (PDCCH) or a MAC-CE for a base station.

24. The receiving device of claim 16, in which the known payload is received in a physical uplink control channel (PUCCH) with related parameters signaled separately via radio resource control (RRC) signaling, downlink control information (DCI), or a media access control layer (MAC) control element (CE), the related parameters comprising at least one of a PUCCH format, uplink control information (UCI) types multiplexed, or payload size.

25. A transmitting device for wireless communication comprising:
a memory; and
at least one processor coupled to the memory and configured:
to communicate about content of a known payload with a receiving device;
to transmit an indication informing the receiving device that the known payload will be transmitted; and
to unicast the known payload to the receiving device for finding labels for training based on the known payload and for online training of a neural network with the labels from the known payload, without fully decoding the known payload.

26. The transmitting device of claim 25, in which the indication comprises a base station indication in either a physical downlink control channel (PDCCH) or a media access control (MAC) layer control element (MAC-CE) in response to the known payload being transmitted in a physical downlink shared channel (PDSCH) for downlink training.

27. The transmitting device of claim 25, in which the indication comprises a user equipment (UE) indication in either a physical uplink control channel (PUCCH) or a media access control (MAC) layer control element (MAC-CE) in response to the known payload being transmitted in a physical uplink shared channel (PUSCH) for uplink training.

28. The transmitting device of claim 25, in which the at least one processor is further configured to transmit information comprising a periodicity, time and frequency resources, and payload size of the known payload, the information carried by radio resource control (RRC) signaling, a media access control layer (MAC) control element, or PDCCH downlink control information (DCI).

29. The transmitting device of claim 25, in which the known payload is based on a radio resource control (RRC) scrambling seed.

30. The transmitting device of claim 25, in which the at least one processor is further configured to request via a physical uplink control channel (PUCCH) or a media access control layer (MAC) control element (CE) for a UE, or via a physical downlink control channel (PDCCH) or a MAC-CE for a base station.

\* \* \* \* \*